United States Patent [19]

Hagan et al.

[11] Patent Number: 4,634,141

[45] Date of Patent: Jan. 6, 1987

[54] AXLE LIFT MECHANISM

[75] Inventors: Lyle M. Hagan, North Muskegon; William C. Pierce, Muskegon, both of Mich.

[73] Assignee: Lear Siegler, Inc., Santa Monica, Calif.

[21] Appl. No.: 627,414

[22] Filed: Jul. 3, 1984

[51] Int. Cl.⁴ .............................................. B60G 11/56
[52] U.S. Cl. .................................... 280/704; 180/24.02
[58] Field of Search ................. 280/704, 43.17, 43.19, 280/43.23; 180/209, 24.02

[56]  References Cited
U.S. PATENT DOCUMENTS

| | | | |
|---|---|---|---|
| 2,864,626 | 12/1958 | Schantz | 280/43.19 |
| 3,771,812 | 11/1973 | Pierce et al. | 280/704 |
| 3,953,011 | 4/1976 | Staehlin et al. | 180/24.02 |
| 4,165,884 | 8/1979 | Allison et al. | 280/704 |
| 4,293,145 | 10/1981 | Taylor | 280/704 |
| 4,373,738 | 2/1983 | Lange | 280/704 |

*Primary Examiner*—John J. Love
*Assistant Examiner*—Ross Weaver
*Attorney, Agent, or Firm*—Varnum, Riddering, Schmidt & Howlett

[57] ABSTRACT

An axle lift mechanism (100) is used on a vehicle having a normally lowered axle/wheel assembly to automatically lift and maintain the assembly in a raised position when the vehicle is not heavily loaded. A trailing arm (62) connected to the vehicle axle (12) is pivotably coupled at one end to the vehicle frame (68) and mounts an air spring (26) at its opposing end to transmit load to the axle (12) when the air spring (26) is inflated. The lift mechanism (100) includes a flexible strap (102) secured at one end to the trailing arm (62) and wound around a pivotable cam (108). The opposing end of the strap (102) is coupled to a rod (128) adjustably engaged with a spring cup (130). A tapered coil spring (152) coaxial with the rod (128) bears against the spring cup (130) and exerts forces on the rod (128) and strap (102) sufficient to rotate the cam (108) and lift the trailing arm (62) and axle (12) to a raised position when the air spring (26) pressure is relieved. The spring cup (130) and tapered coil spring (152) are enclosed in a tubular housing (146) and a wear plate (154) is mounted to the outer spring cup surface. The flexible strap (102) comprises spaced apart cords (156) embedded in flexible polyurethane or other suitable material (158) and formed by winding a Kevlar or other suitable cable between a pair of sleeves (160).

20 Claims, 8 Drawing Figures

AXLE LIFT MECHANISM

DESCRIPTION

1. Technical Field

The invention relates to axle lift mechanisms for load-carrying vehicles and, more particularly, to lift mechanisms for automatically raising an axle/wheel assembly so as to disengage the wheels from a ground surface.

2. Background Art

Several types of vehicles, including semi-trailer truck vehicles and the like, have multiple sets of axle/wheel assemblies arranged in tandem so as to adequately support relatively heavy loads. To adjust the load support provided by these tandem assemblies, it is known to employ suspension systems utilizing adjustably pressurized air springs and the like.

When the vehicle is carrying a relatively light load, it is desirable to relieve the load transmitting relationship between the vehicle and one or more of the tandem axle/wheel assemblies, and also to disengage the axle/wheel assembly from ground contact so as to reduce tire wear. To relieve load support when an air suspension system is employed, air pressure can be reduced. To achieve disengagement of the tires from the ground surface, devices commonly referred to as axle lift mechanisms can be employed. Prior lift mechanisms utilized stressed mechanical springs acting directly between a vehicle frame and the axle. When the downward load forces exerted on the axle by the suspension system were relieved, such as through deflation of air springs, lifting forces exerted by the mechanical springs pulled the axle upwardly to a raised position.

The foregoing type of lift mechanism has several disadvantages. For example, with the axle in a raised position, sufficient spring stress must be maintained to support the axle and various components of the suspension system. Correspondingly, the substantially increased spring stress when the axle is in the lowered position comprises preload forces on the suspension system, thereby reducing the actual maximum vehicle payload carried by the suspension system.

Figure 1:
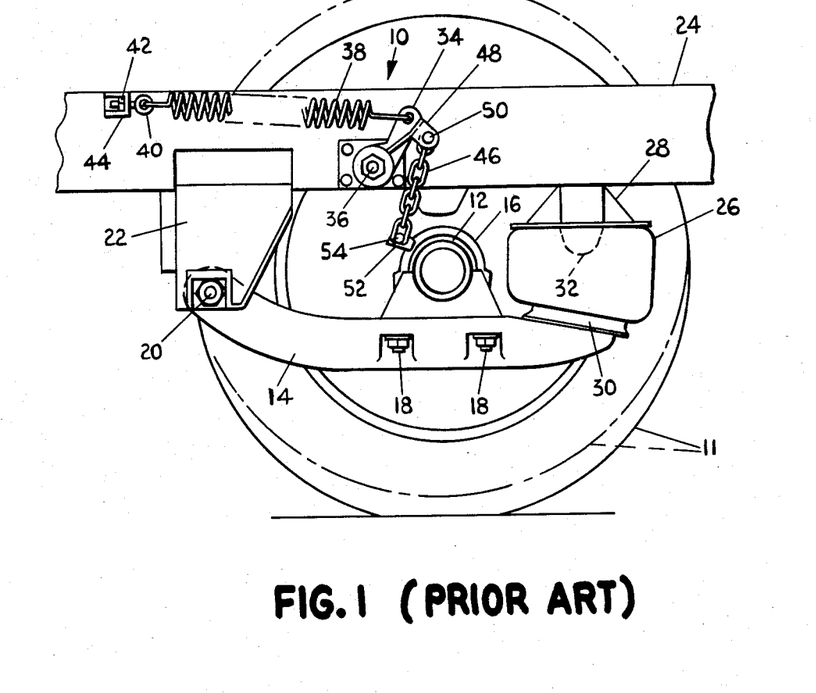
FIG. 1 is a side elevational view in section of a prior art axle lift mechanism.

Improved axle lift mechanisms were later developed which overcame the problem of substantial payload reduction. An example of one such axle lift mechanism is depicted in FIG. 1 and generally corresponds to the mechanism disclosed in the commonly assigned U.S. Pat. No. to Pierce et al, 3,771,812, issued Nov. 13, 1973.

Referring to FIG. 1, a lift mechanism 10 is used with a vehicle having a wheel 11 mounted to an axle 12. The axle 12 is connected to a trailing arm 14 through a conventional U-bolt 16 and nuts 18. The trailing arm 14 is pivotably mounted through pivot connection 20 to a bracket 22 rigidly secured to the vehicle frame 24. The opposing end of the trailing arm 14 is secured to a conventional air spring 26 having a rolling lobe configuration mounted to the vehicle frame 24 through bracket 28.

The air spring 26 includes a piston element 30 directly mounted to the trailing arm 14 and extending inwardly into the rolling lobe. When the air spring 26 is inflated, load from the vehicle is transmitted through the vehicle frame 24 to the trailing arm 14. The force exerted by the air pressure in air spring 26 pivots the trailing arm 14 through the pivot connection 20 so that wheel 11 engages the ground surface.

The axle lift mechanism 10 includes a lever arm 34 mounted to the vehicle frame 24 through a conventional pivot connection 36. One end of a coil spring 38 is connected to the lever arm 34 above the pivot connection 36 as shown in FIG. 1, with an opposing end of spring 38 secured to vehicle frame 24 in a manner so as to be adjustably tensioned. For example, the adjustable connection between spring 38 and frame 24 can include a frame bracket 44 securing a screw eye 40 having a threadably engaged nut 42. Adjusting the axial position of nut 42 on screw eye 40 correspondingly adjusts the tension of spring 38.

The lift mechanism also includes an axle lifting link chain 46 having an upper end secured to lever arm 34 through clevis 48 and bolt 50. A lower end of the lifting link chain 46 is secured to the axle 12 through an apertured lug 52 mounted through axle-attaching hardware to axle 12 and secured to the link chain 46 with bolt 54.

When the vehicle is carrying a relatively light load, it is desirable to disengage the wheel 11 from a ground surface. Accordingly, air pressure in the air spring 26 is decreased and the load forces normally exerted on the trailing arm 14 by vehicle frame 24 are correspondingly relieved. With the load forces on trailing arm 14 relieved, the tension of coil spring 38 rotates lever arm 34 in a counterclockwise direction. Correspondingly, link chain 46 lifts the wheel 11 and axle 12 to an appropriately raised position as shown in dotted line format in FIG. 1. In the raised position, the top of the piston element 30 of air spring 26 bears against a bumper or stop 32 and provides a limitation to upward movement.

The aforedescribed axle lift mechanism 10 is somewhat advantageous over previously designed lifting mechanisms in that the lever-type mechanical "lifting advantage" is decreased as the lever arm 34 pivots in a clockwise direction as viewed in FIG. 1 and axle 12 moves to a lowered position. Accordingly, although the coil spring 38 is increasingly stressed as lever arm 34 rotates clockwise, lifting forces on axle 12 are not substantially increased, because of the decrease in mechanical lever-type advantage. The flexibility of the lifting link chain 46 is advantageous over rigid links between lever arm 34 and axle 12 in that alignment problems do not result in severe defects in operation. In addition, a rigid linking structure is subject to permanent deformation if it sustains a sharp blow or the like.

Figure 2:
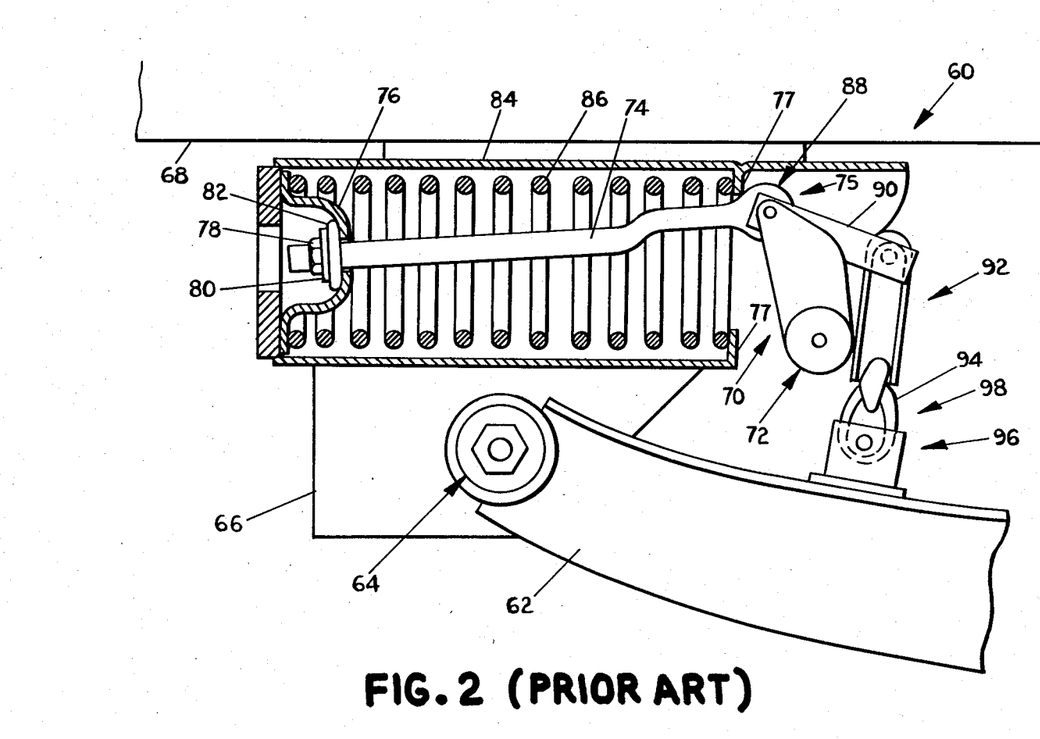
FIG. 2 is a side elevational view in section of another prior art axle lift mechanism.

Another type of known axle lifting mechanism is depicted as lift mechanism 60 shown in FIG. 2. Lift mechanism 60 is used with a trailing arm 62 pivotably mounted at one end to a bracket 66 through pivot connection 64. Bracket 66 is rigidly secured to a support frame 68 of a load-carrying vehicle. Although not shown in FIG. 2, the trailing arm 62 can also be connected to a vehicle axle and releasably coupled in a load supporting relationship to vehicle frame 68 through an air suspension system in a manner similar to trailing arm 14 depicted in FIG. 1.

The lift mechanism 60 includes a lever arm 70 having its lower end coupled to the vehicle frame 68 through a pivot connection 72. A rigid forged bar 74 is pivotably coupled at one end to a top portion of the lever arm 70 in an overcenter arrangement through pivot connection 75. An opposing end of forged bar 74 is received through an aperture of a spring cup 76 and secured thereto with nut 78, washer 80 and bushing 82.

The spring cup 76 and forged bar 74 are mounted within a tubular housing 84 shown in sectional configuration in FIG. 2. A compression spring 86 is also linearly mounted within the housing 84. One end of spring 86 bears against spring cup 76, while the other end of spring 86 bears against a stationary lip 77 of housing 84. Tension forces exerted on spring cup 76 by spring 86 can be varied by adjusting the axial location of threaded nut 78 along bar 74.

Also coupled to lever arm 70 and forged bar 74 at the pivot connection 75 is a bar link 90. The bar link 90 is correspondingly connected to a clevis link 92 and lifting chain 98 comprising a series of links 94. The lifting chain 98 is connected at its lower end to the trailing arm 62 through anchor 96.

The operation of the axle lift mechanism 60 is similar to the operation of the lift mechanism 10 previously described with respect to FIG. 1. That is, with the air spring (not shown) in a deflated state, the lift mechanism 60 will operate to lift the trailing arm 62 and interconnected axle and wheels. The lifting force is provided by forces exerted by the compression spring 86 bearing against spring cup 76. The forces exerted on spring cup 76 are translated through the forged bar 74 to rotate the lever arm 70 through pivot connection 72. Rotation of lever arm 70 correspondingly exerts lifting forces on trailing arm 62 through bar link 90, clevis link 92 and lifting chain 98.

In the raised position, the lever arm 70 and other components of lift mechanism 60 will have the relative positions depicted in FIG. 2. When the air spring is adequately inflated, forces exerted thereby on the trailing arm 62 overcome the forces exerted by compression spring 86, and the trailing arm 62 moves to a lowered position, thereby rotating the lever arm 70. As the lever arm 70 pivots in a clockwise direction as viewed in FIG. 2, the lever-type mechanical "lifting advantage" is decreased. That is, although the forces exerted by the compression spring 86 increase as lever arm 70 pivots, the lifting forces on trailing arm 62 will not substantially increase.

Although the previously described axle lift mechanism is advantageous over other devices, substantial frictional forces are generated during movement of the spring cup 76 relative to housing 84. Frictional forces are also generated in the regions surrounding the coupling of bar 74 to spring cup 76 and the spring cup 76 and compression spring 86 bearing surfaces. Furthermore, the spring 86 exhibits wear due to its close proximity with the tubular housing 84. This wear causes accelerated spring failure.

In addition to the foregoing, it has also been found that the lifting forces exerted on the trailing arm 62 relative to the distance of the axle away from a raised position are relatively nonuniform. That is, as the trailing arm 62 and interconnected axle move downward from the raised position, the rate of change of the lifting forces exerted by compression spring 86 through forged bar 74, links 90 and 92, and link chain 98 is a relatively variable and nonuniform rate. The lifting forces increase at a nonuniform rate until the lever arm 70 rotates through an angle whereby the rate of lifting force increase resulting from contraction of compression spring 86 is overcome by the decreasing mechanical advantage resulting from the decrease in lever arm distance between pivot connection 72 and the forged bar 74. Accordingly, during travel of the trailing arm 62 away from an initial raised position, the lifting forces exerted on the trailing arm 62 exhibit a nonuniform increase up to a maximum, from which point further travel results in a relatively rapid and nonuniform rate of decrease in the lifting forces.

SUMMARY OF THE INVENTION

In accordance with the invention, an improvement is provided in an axle lift mechanism used on a vehicle having a support frame and suspension means, including an axle coupled to the frame for selective movement between load bearing and non-load bearing relationships with the vehicle. The lift mechanism includes cam linkage means pivotably coupled to the frame and to the suspension means for rotation between first and second positions, corresponding to the load bearing and non-load bearing positions, respectively. Spring biasing means are coupled to the frame and to the cam linkage means to bias the cam linkage means to the second position.

In accordance with the invention, the cam linkage means includes a flexible strap operatively connecting the spring biasing means and the suspension means. The strap is connected so that forces exerted by the biasing means are translated coaxially with the biasing means through the flexible strap to lifting forces exerted on the suspension means.

The biasing means includes compressible means for exerting a vector sum of the biasing forces along a first force line. A first portion of the flexible strap is operatively coupled to the biasing means so that the first strap portion remains parallel to the first force line during rotation of the cam linkage means.

The cam linkage means includes a rigid rod connected between the flexible strap and the biasing means. Correspondingly, the biasing means includes compressible means having one end maintained stationary relative to the frame for exerting the biasing forces. The biasing means also includes translation means bearing against another end of the compressible means and operatively coupled to the flexible strap to compress the compressible means during movement of the axle from the non-load bearing position toward the load bearing position.

The compressible means comprises a coiled spring maintained in a compressed state throughout lifting and lowering of the axle. Correspondingly, the translation means includes a spring cup bearing against one end of the coiled spring. The coiled spring is tapered outwardly from the spring cup.

The lift mechanism also includes housing means connected to the frame for at least partially enclosing the coiled spring and the spring cup. At least one wear plate is connected to the spring cup intermediate adjacent surfaces of the spring cup and housing.

The spring cup includes a central aperture, and the rigid rod of the linkage means is received through the aperture. The mechanism also includes means for axially adjusting the location of the spring cup along the rod.

The cam linkage means includes a cam having lower and upper portions. In addition, the linkage means also includes pivot means for pivotably connecting the lower portion of the cam relative to the vehicle frame. Means are included for mounting the flexible strap to the upper portion of the cam. The cam is shaped so that the distance between the pivot means and the lines of forces exerted along the strap between the cam and biasing means remains constant during rotation of the cam.

The means for mounting the strap includes a pair of transverse guide shafts mounted above the pivot means. The cam also includes first surface means for bearing against a portion of the flexible strap extending between the cam and the biasing means. Second surface means are provided for bearing against a portion of the flexible strap extending between the cam and the axle. Movement of the axle from a load bearing to a non-load bearing position increases the amount of the strap bearing against the second surface means and decreases the amount of the strap bearing against the first surface means. The cam is also shaped and operatively mounts the flexible strap so that lifting forces exerted on the axle increase at a relatively constant rate as the axle moves from a raised to a lowered position.

The flexible strap comprises a cable constructed of Kevlar or other suitable material. The strap is formed by continuously winding a single Kevlar or other suitable cable back and forth between its ends so as to form a series of parallel and planar cords therebetween. The cords are encased in a flexible plastic cover. The sheets include flexible polyurethane and are glued or otherwise molded together with the cords positioned therebetween.

BRIEF DESCRIPTION OF THE DRAWINGS

The invention will now be described with respect to the drawings in which.

DETAILED DESCRIPTION

Figure 3:
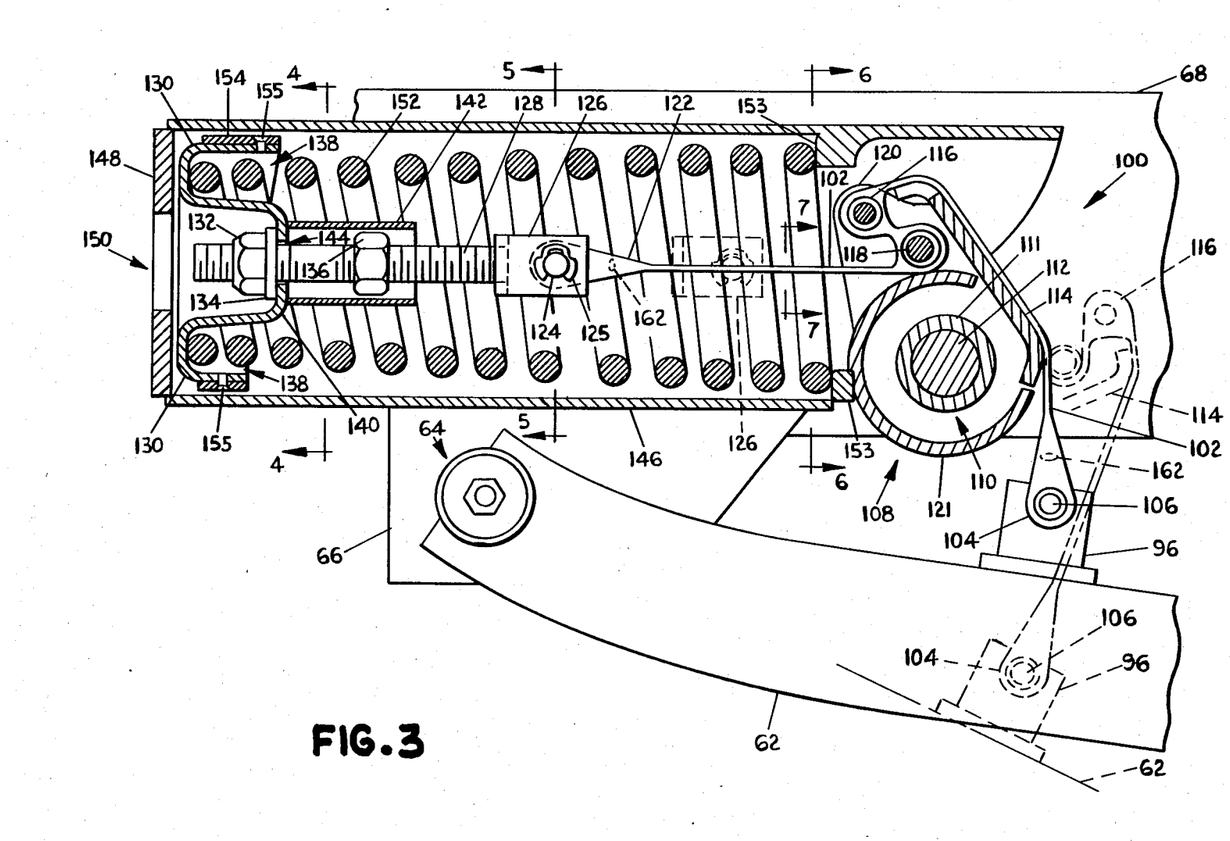
FIG. 3 is a side elevational view in section of an axle lift mechanism in accordance with the invention.

The principles of the invention are disclosed, by way of example, in an axle lift mechanism 100 as depicted in FIG. 3. Like the known axle lift mechanisms 10 and 60 previously described with respect to FIGS. 1 and 2, respectively, lift mechanism 100 is adapted for use with load carrying vehicles, such as semi-trailer truck vehicles and the like, for automatically lifting a vehicle axle to a raised position when the vehicle is not heavily loaded. The lift mechanism 100 is also adapted to allow the axle to move from a raised position to a lowered position when the axle is in a load transmitting relationship with the vehicle frame.

With like numbered elements corresponding to similar elements of the vehicles and lift mechanisms previously described with respect to FIGS. 1 and 2, the axle lift mechanism 100 is shown in FIG. 3 in use on a vehicle having a trailing arm 62 pivotably mounted at one end to a vehicle frame bracket 66 through a pivot connection 64. Bracket 66 is, in turn, rigidly secured to a frame 68 of the vehicle. Although not shown in FIG. 3 of the drawings, an axle movable between raised and lowered positions can be conventionally coupled to the trailing arm 62 in a manner similar or comparable to that previously described with respect to FIG. 1. In addition, a suspension system such as air spring 26 shown in FIG. 1 can be mounted to the opposing end of arm 62 for selectively engaging or disengaging the axle from a load transmitting relationship with vehicle frame 68.

Rigidly mounted to the upper surface of trailing arm 62 in a spaced apart relationship from the pivot connection 64 is a conventional anchor 96. The lift mechanism 100 includes a flexible strap 102 having one end 104 flexibly coupled to the anchor 96 through anchor bolt 106 or other comparable connecting means.

Figure 6:
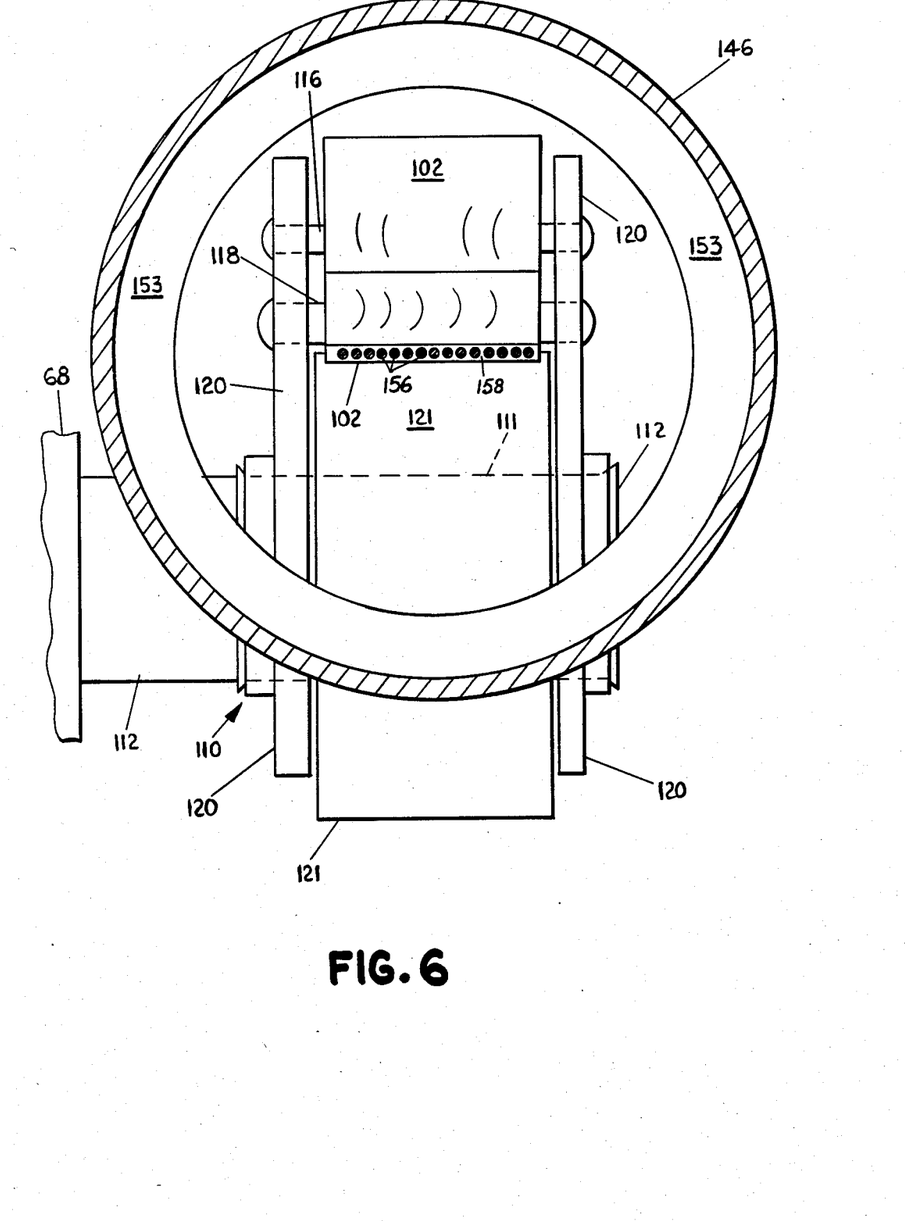
FIG. 6 is a sectional view showing the relative configurations of the cam and flexible strap of the axle lift mechanism, taken along lines 6—6 of FIG. 3.

The strap 102 extends upwardly from the anchor 96 and engages a cam 108 as depicted in FIG. 3. Referring to FIGS. 3 and 6, cam 108 is pivotably mounted to the vehicle frame 68 through a pivot connection 110 comprising a pivot tube 111 and rocker shaft 112 coupled to frame 68 and received through tube 111. Bearings or similar means can be employed to provide relatively frictionless movement of shaft 112 relative to tube 111. The tube 111 extends between and is secured to a pair of end supports 120, only one end support 120 being shown on FIG. 3. With the tube 111 rotatably receiving the rocker shaft 112, the tube 111 and interconnected end supports 120 can freely rotate relative to shaft 112.

The cam 108 also includes a curved wrapper 121 welded or otherwise secured to end supports 120 at their lower portion. At the rear portion of cam 108, the end supports 120 curve inwardly and are integrally secured to a tongue portion 114, extending upwardly along the rear of cam 108. With the cam 108 in the position shown in FIG. 3, the flexible strap 102 extends along the tongue 114 and is received on an upper guide shaft 116 transversely mounted between the cam end supports 120. The strap 102 is further threaded around a lower guideshaft 118 also transversely mounted to the end supports 120.

Figure 5:
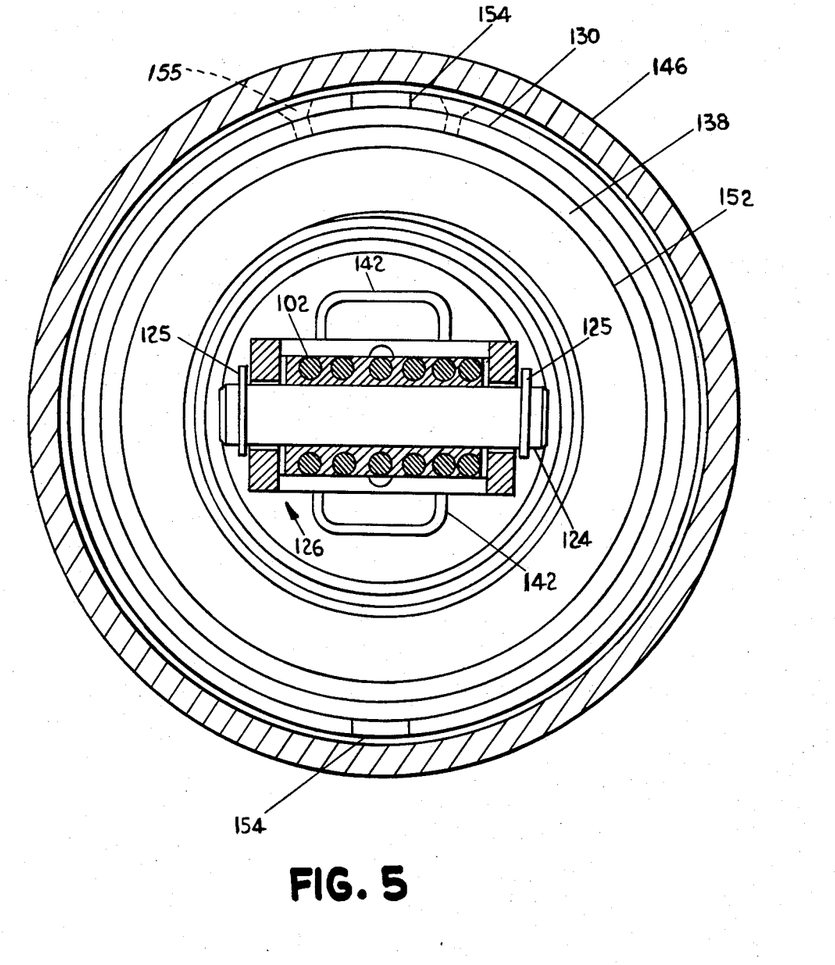
FIG. 5 is a sectional view of the axle lift mechanism showing the configuration of the clevis connection between the flexible strap and rod, taken along lines 5—5 of FIG. 3.

The flexible strap 102 extends outwardly between the lower guide shaft 118 and cam wrapper 121 into a tubular housing 146 secured by suitable mounting means (not shown) to the vehicle frame 68. As shown in FIGS. 3 and 5, a terminating end 122 of the flexible strap 102 is secured to a clevis 126 through a pin 124 secured to the clevis 126 by means of retaining rings 125.

Figure 4:
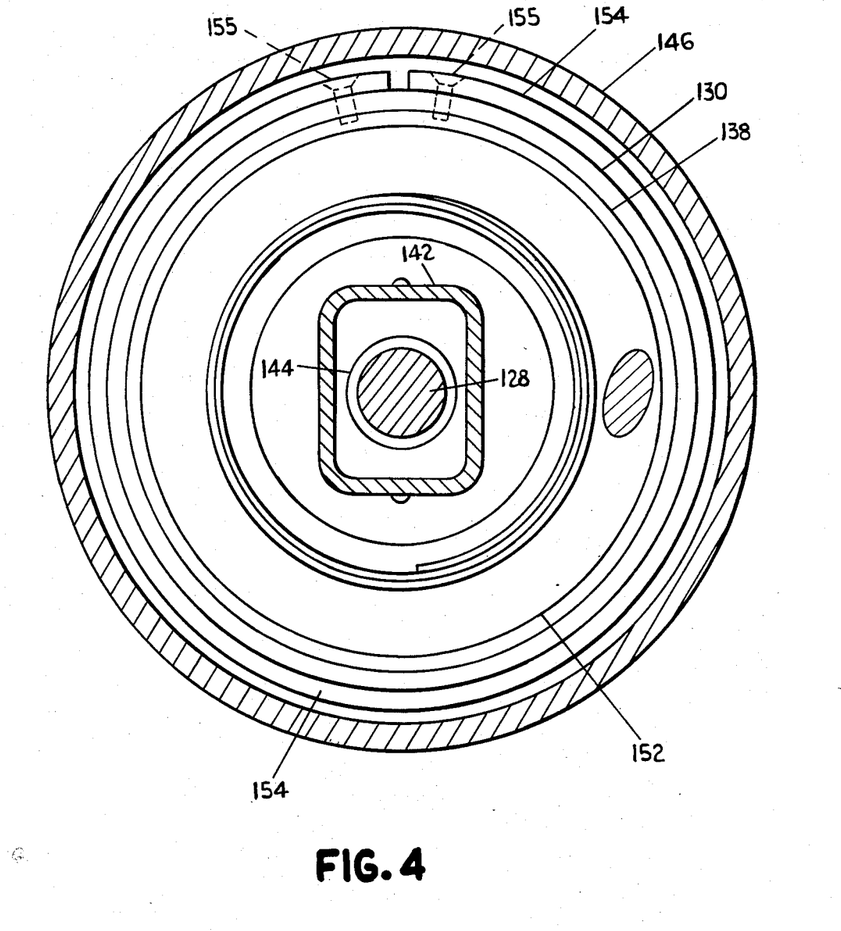
FIG. 4 is a sectional view of the axle lift mechanism showing the configuration of the spring cup, taken along lines 4—4 of FIG. 3.

Extending outwardly from an opposing end of clevis 126 and rigidly welded or otherwise secured thereto in substantially the same plane as strap 102 is a threaded rod or bolt 128. Referring to FIGS. 3 and 4, the bolt 128 is received through an aperture 144 of a spring cup 130. A nut 132 threadably engaged on bolt 128 holds a bushing 134 in an abutting relationship against a surface of spring cup 130.

The spring cup 130 has a substantially round configuration with a peripheral recess 138 and integral central portion 140, the aperture 144 extending through central portion 140. An annular inner rod housing 142 is welded or otherwise secured to the central portion 140, and a portion of the threaded rod 128 axially extends therethrough. A second nut 136 is threadably received (and rigidly attached) on the rod 128 to prevent rotation of threaded rod 128 within housing 142, and prevents twisting of the strap 102 during adjustment of the coil spring 152 subsequently described herein.

The end of the tubular housing 146 adjacent spring cup 130 can be enclosed by an end cover 148 or similar means, with an opening 150 centrally positioned therein. Opening 150 allows for adjustment of nut 132 on threaded rod 128, so as to allow biasing of the position of rod 128 relative to spring cup 130 without any substantial disassembly of lift mechanism 100.

Bearing against the spring cup 130 within recess 138 is one end of a tapered coil spring 152 as shown in FIG. 3. The coil spring 152 extends longitudinally through the housing 146, with the threaded rod 128, clevis 126 and interconnected strap 102 located along the axis of spring 152. The opposing end of spring 152 bears against an inner housing lip 153. The coil spring 152 tapers outwardly from the spring cup 130 to the housing lip 153. Mounted to the spring cup 130 intermediate the outer cylindrical surface of cup 130 and the inner surface of tubular housing 146 is an annular wear plate 154. The wear plate 154 maintains a spaced relationship between the spring cup 130 and tubular housing 146, and is secured to cup 130 with connecting screws 155 or similar securing means.

Figures 7, 8:
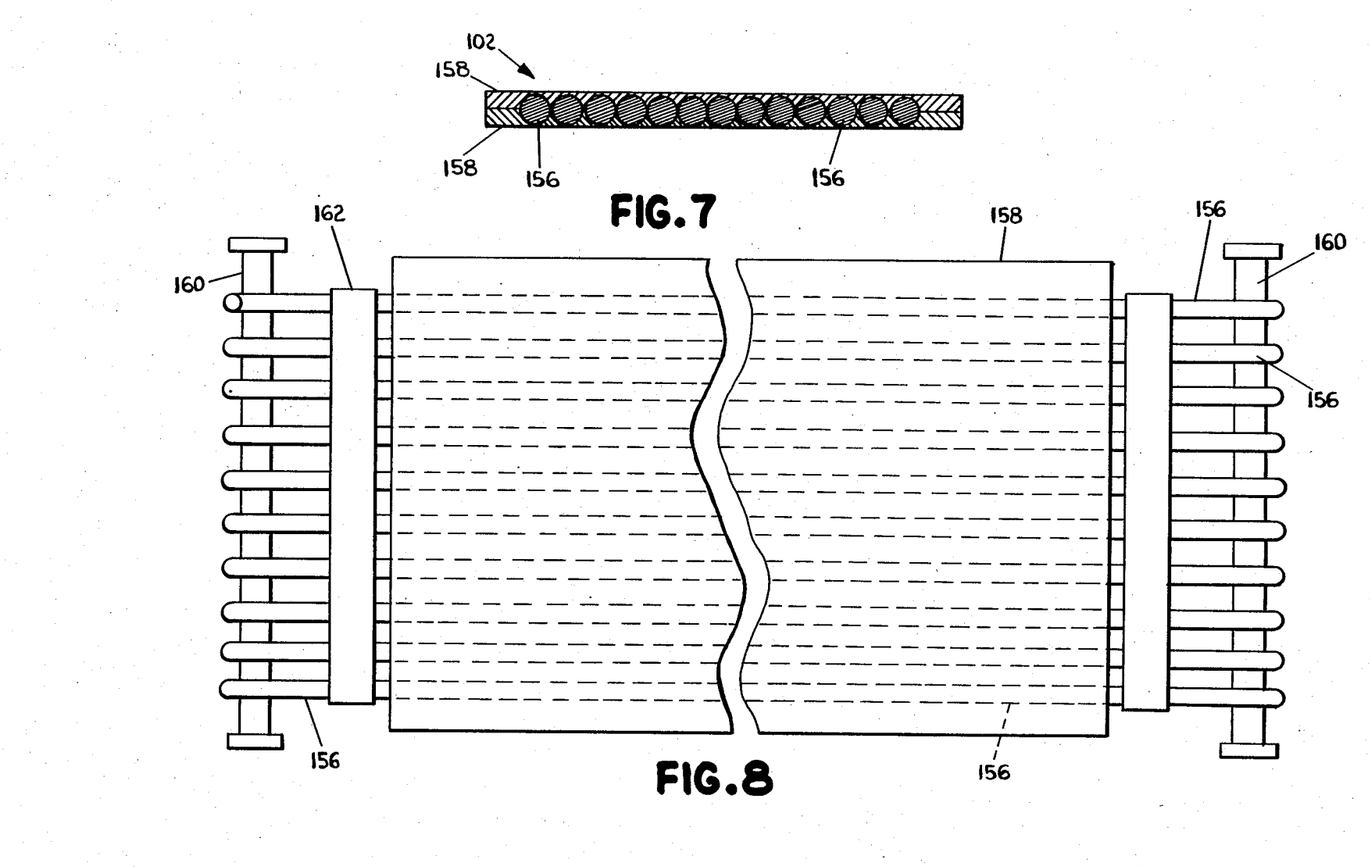
FIG. 7 is an enlarged sectional view of the flexible strap, taken along lines 7—7 of FIG. 3.
FIG. 8 is a plan view of the flexible strap during formation.

Referring specifically to FIG. 7, the flexible strap 102 can preferably include a set of spaced apart cords 156 formed from material such as that commercially sold by DuPont Corporation under the trademark Kevlar, or other suitable cable and like articles. The cords 156 are encased in flexible polyurethane 158 or other material suitable for holding the cords 156 in place, by means such as molding the cords 156 within the polyurethane.

As shown in FIG. 8, the strap 102 can be formed by first winding a single Kevlar or other suitable cable continuously back and forth between a pair of sleeves 160 to form the set of cords 156. Preferably, the flexible polyurethane 158 can then be molded with the Kevlar or other suitable cords 156 embedded therebetween. Alternatively, the cords 156 can be encased within the polyurethane 158 by means of heat-sealing or similar adhesive treatments. During construction of the flexible strap 102, clamps 162 can be utilized at each end of the strap 102 adjacent the holding sleeves 160 so as to ensure the cords lay in a single planar layer to reduce stress when the strap 102 is bent over a cam surface. It should also be noted that the spacing of the cords 156 can vary. For example, the cords 156 shown in FIG. 7 are spaced more closely together than are the cords 156 shown in FIG. 8.

The operation of the axle lift mechanism 100 will now be described with respect to FIGS. 3-6.

When the axle is in the raised position, elements of lift mechanism 100 will have the relative configurations shown in solid-line format in FIG. 3. When the axle is in the lowered position, the trailing arm 62, anchor 96, cam 108 and clevis 126 will have the relative configurations shown in dotted-line format in FIG. 3.

When the axle is in the lowered position, and it is desired to lift the axle to the raised position, air pressure in the previously described air spring assembly can be decreased so as to relieve vehicle load from the trailing arm 62. When the vehicle load is relieved, the only forces exerted downwardly on the flexible strap 102 through anchor 96 will be the weight of the trailing arm 62 and axle. Lifting forces will be exerted on the trailing arm 62 by compression spring 152 acting through strap 102. That is, spring 152, being in a loaded state, will exert forces on the spring cup 130 so as to move the spring cup 130 toward the position adjacent end cover 148 as shown in FIG. 3. In turn, spring cup 130 will exert pulling forces on threaded rod 128 through the central portion 140 bearing against bushing 134.

With threaded rod 128 connected to flexible strap 102 through clevis 126, corresponding forces are exerted on the flexible strap 102. With the cam 108 pivotable through rocker shaft 112, and the flexible strap 102 wound around guide shafts 116 and 118, the cam 108 will be rotated in a counterclockwise direction as viewed in FIG. 3. Rotation of cam 108 will exert lifting forces on trailing arm 62 through strap 102 and anchor 96. As the cam 108 rotates towards the raised position, the length of flexible strap 102 bearing against tongue 114 will increase, while the length of strap 102 bearing against wrapper 121 will decrease. The cam 108 therefore acts as a lever to translate linear forces exerted on flexible strap 102 through rod 128 to upward lifting forces at the connection of flexible strap 102 to trailing arm 62. Accordingly, the trailing arm 62 and interconnected wheel/axle assembly (not shown) are lifted toward a raised position so that the wheels are disengaged from a ground surface.

It should be noted that the threaded rod 128 maintains a substantially coaxial relationship to the spring cup 130 and spring 152. Furthermore, lines of force exerted through the portion of flexible strap 102 interconnecting rod 128 and cam 108 remain parallel to rod 128 during lifting of the axle. Accordingly, the vector sum of the forces exerted on spring cup 130 is coaxial with rod 128 and parallel to force lines through strap 102. By maintaining this relationship, frictional forces between the spring cup 130 and the tubular housing 146, and between spring cup 130, spring 152 and rod 128 are minimized relative to frictional forces exhibited in other types of lift mechanisms. In addition, the lift mechanism 100 provides a relatively uniform lifting force change rate on the axle throughout movement between the lowered and raised axle positions.

When it is desired to transmit vehicle load to the wheel/axle assembly, the previously described air spring assembly can be inflated so as to exert downward forces on the end of trailing arm 62 opposing the pivot connection 64. With the downwardly exerted forces exerted on trailing arm 62 sufficient to overcome the lifting forces exerted by the coil spring 152 through flexible strap 102, the cam 108 will rotate through rocker shaft 112 in a clockwise direction as viewed in FIG. 3. As the cam 108 rotates, the length of flexible strap 102 bearing against tongue 114 will decrease. Correspondingly, however, an increasing portion of the flexible strap 102 between clevis 126 and lower guideshaft 118 will bear against the cam wrapper portion 121. With the cam 108 rotating in a clockwise direction, forces are exerted on threaded rod 128 through clevis 126 and flexible strap 102. These forces are correspondingly exerted on spring cup 130 through bushing 134 in a direction opposing forces exerted by tapered coil spring 152. Accordingly, clevis 126, threaded rod 128 and spring cup 130 will move to the right as viewed in FIG. 3.

As the spring cup 130 moves toward the cam 108, the tapered coil spring 152 is increasingly loaded and exerts increasing forces against spring cup 130 opposing movement. As the cam 108 rotates, the lifting forces provided by the lever arm advantage of the cam 108 relative to the rod 128 connection decrease. However, with the tapered coil spring 152 being increasingly tensioned as the cam 108 rotates, the opposing forces exerted on rod 128 through spring cup 130 will correspondingly increase. Accordingly, the lifting forces exerted on trailing arm 62 as the cam 108 rotates either clockwise or from its raised position, or counterclockwise from a lowered position, change at a substantially uniform rate.

By maintaining the forces acting through rod 128 substantially coaxial relative to spring cup 130 and spring 152, relative friction between cup 130, tapered coil spring 152 and tubular housing 146 is minimized. Tapering of the coil spring 152, in addition to the arrangement of cam 108, flexible strap 102 and threaded rod 128, provides for a relatively higher and more uniform lifting force on trailing arm 62.

In addition, the flexible strap 102, constructed of Kevlar or other suitable material and providing linkage between threaded rod 128 and trailing arm 62, has a relatively high tensile strength. Furthermore, the strap 102 has a relatively minimum tendency to stretch and provides good abrasion resistance. In addition, with the strap 102 constructed as described herein, manufacturing costs are relatively less expensive.

It will be apparent to those skilled in the pertinent arts that other embodiments of an axle lift mechanism in accordance with the invention can be designed. That is, the principles of an axle lift mechanism are not limited to the specific embodiment described herein. Modifications and other variations of the above-described illustrative embodiment of the invention may be effected without departing from the spirit and scope of the novel concepts of the invention.

The embodiments of the invention in which an exclusive property or privilege is claimed are defined as follows:

1. In an axle lift mechanism for use in a vehicle having a support frame, and suspension means including an axle coupled to the frame for selective movement between load bearing and non-load bearing relationships with the vehicle, wherein the lift mechanism comprises:
    cam linkage means pivotably coupled to the frame and to the suspension means for rotation between first and second positions corresponding to the load bearing and non-load bearing positions, respectively; and
    spring biasing means coupled to said frame and to said cam linkage means to bias said cam linkage means to the second position, said spring biasing means comprising a compression spring having one end maintained stationary relative to the frame for exerting the biasing forces and a translation means bearing against another end of the compression spring and operatively coupled to the cam linkage means for compressing the compression spring during movement of the axle from the non-load bearing position toward the load bearing position;
    the improvement wherein the cam linkage means comprises a flexible strap operatively connecting the spring biasing means and the suspension means, and a cam so shaped that the force exerted along the strap between the cam and compression spring remains coaxial during rotation of the cam so that forces exerted by the biasing means are translated coaxially with the biasing means through the flexible strap to lifting forces exerted on the suspension means.

2. An axle lift mechanism in accordance with claim 1 wherein:
    the compression spring exerts a vector sum of the biasing forces along a first force line; and
    a first portion of the flexible strap is operatively coupled to the compression spring so that the first strap portion remains parallel to the first force line during rotation of the cam linkage means.

3. An axle lift mechanism in accordance with claim 1 wherein the cam linkage means comprises a rigid rod connected between the flexible strap and the compression spring.

4. An axle lift mechanism in accordance with claim 1 wherein the compression spring comprises a coiled spring which is maintained in a compressed state throughout lifting and lowering of the axle.

5. An axle lift mechanism in accordance with claim 4 wherein the translation means comprises a spring cup bearing against one end of the coiled spring.

6. An axle lift mechanism in accordance with claim 5 wherein the coiled spring is tapered outwardly from the spring cup.

7. An axle lift mechanism in accordance with claim 5 and further comprising:
    housing means connected to the frame for at least partially enclosing the coiled spring and the spring cup; and
    at least one wear plate connected to the spring cup intermediate adjacent surfaces of the spring cup and housing.

8. An axle lift mechanism in accordance with claim 5 wherein:
    the spring cup includes a central aperture; and
    the linkage means further comprises a rigid rod coupled to the flexible strap and received through the aperture, and means for preventing twisting of the strap during adjustment of the coiled spring.

9. An axle lift mechanism in accordance with claim 8 and further comprising means for axially adjusting the location of the spring cup along the rod.

10. An axle lift mechanism in accordance with claim 1 wherein the cam linkage means further comprises:
    a cam having lower and upper portions;
    pivot means for pivotably connecting the lower portion of the cam relative to the vehicle frame; and
    means for mounting the flexible strap to the upper portion of the cam.

11. An axle lift mechanism in accordance with claim 10 wherein the strap mounting means comprises a pair of transverse guide shafts mounted above the pivot means.

12. An axle lift mechanism in accordance with claim 10 wherein the cam further comprises:
    first surface means for bearing against a portion of the flexible strap extending between the cam and the biasing means;
    second surface means for bearing against a portion of the flexible strap extending between the cam and the axle; and
    movement of the axle from the load bearing to the non-load bearing position increases the amount of the strap bearing against the second surface means and decreases the amount of the strap bearing against the first surface means.

13. An axle lift mechanism in accordance with claim 10 wherein:
    the biasing means comprises compressible means for exerting linearly increasing biasing forces as the cam linkage means moves from the second position to the first position; and
    the cam is shaped and operatively mounts the flexible strap so that the lifting forces exerted on the axle increase at a relatively constant rate as the axle moves from a raised to a lowered position.

14. An axle lift mechanism in accordance with claim 1 wherein the flexible strap comprises a cable constructed of Kevlar or other suitable material.

15. An axle lift mechanism in accordance with claim 1 wherein the flexible strap is formed by continuously winding a single Kevlar or other suitable cable back and forth between its ends so as to form a series of parallel and planar cords therebetween, and encasing the cords between a pair of flexible plastic sheets or molded enclosure.

16. An axle lift mechanism in accordance with claim 15 wherein the sheets comprise flexible polyurethane and are glued or molded together with the cords positioned therebetween.

17. In an axle lift mechanism for use in a vehicle having a support frame, an axle movable between lowered and raised positions, and suspension means for selectively engaging and disengaging the axle from a load transmitting relationship with the vehicle, wherein the lift mechanism comprises:

lever means pivotably coupled to the frame for rotation between first and second positions corresponding to the lowered and raised axle positions, respectively;

biasing means for exerting forces relative to the frame and sufficient to rotate the lever means from the first position to the second position, and lift the axle from the lowered position to the raised position in response to load-transmitting disengagement of the axle; and linkage means for operatively coupling the biasing means to the lever means, and for operatively coupling the lever means to the axle;

the improvement wherein the linkage means comprises a flexible strap for translating the biasing forces to lifting forces exerted on the axle and formed by continuously winding a Kevlar or other suitable cable back and forth between its ends so as to form a series of parallel cords therebetween, and encasing the cords between a pair of flexible plastic sheets.

18. An axle lift mechanism in accordance with claim 17 wherein the plastic sheets are constructed of flexible polyurethane and are secured together with the cords therebetween.

19. An axle lift mechanism in accordance with claim 18 wherein the plastic sheets are glued together.

20. An axle lift mechanism in accordance with claim 18 wherein the plastic sheets are molded together.

* * * * *